Figure 6:
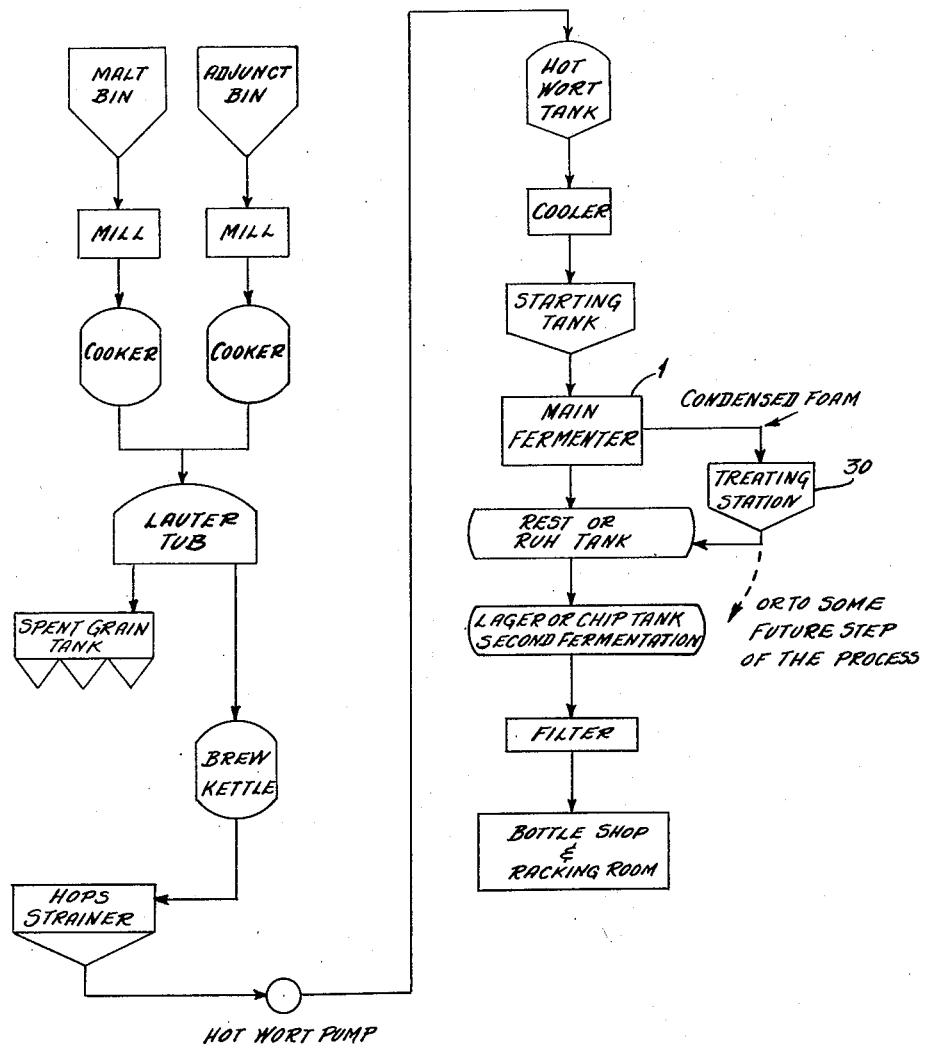

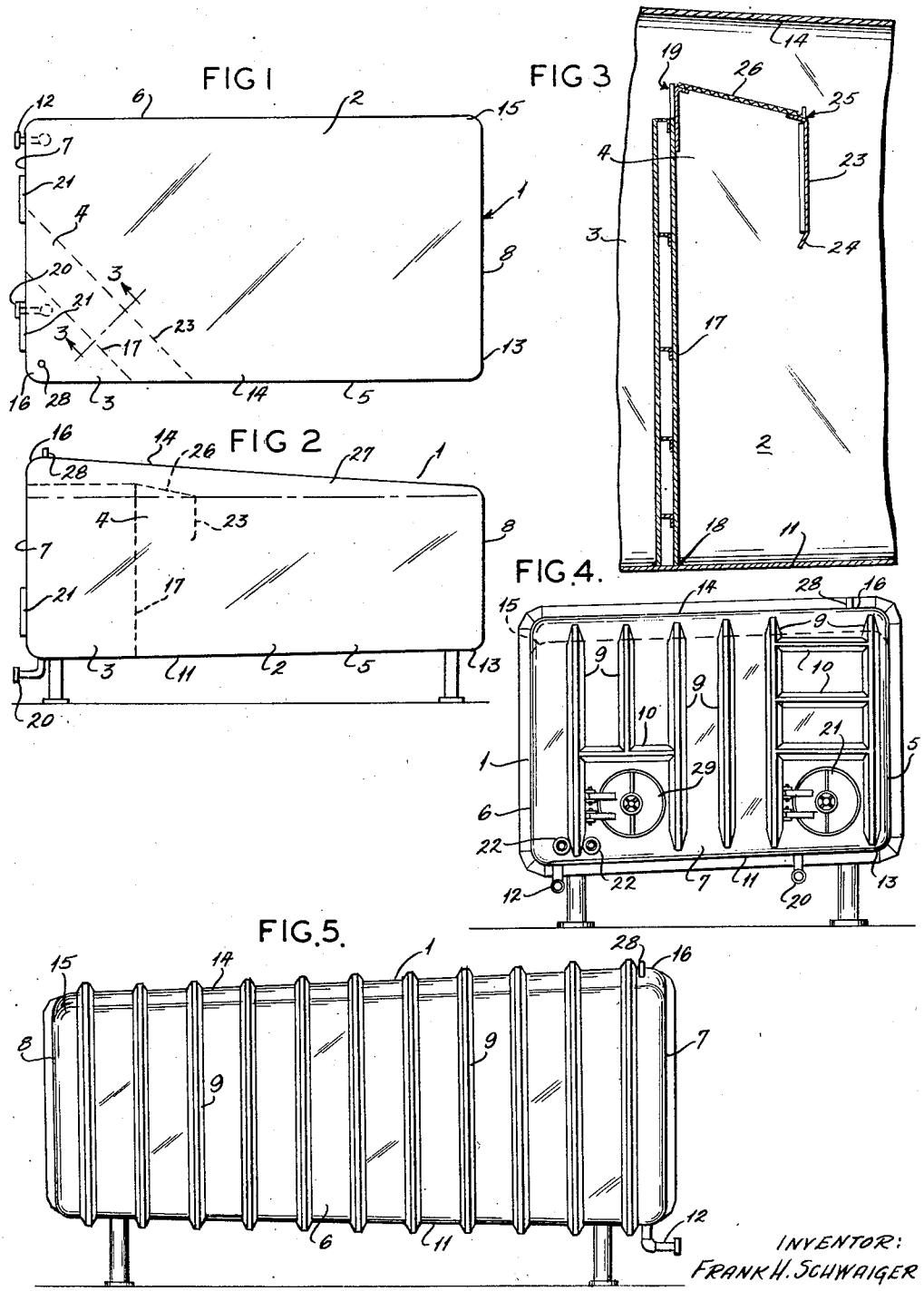

Feb. 11, 1958     F. H. SCHWAIGER     2,823,125
APPARATUS FOR AND PROCESS OF FERMENTING BEER

Filed March 9, 1956     2 Sheets-Sheet 2

INVENTOR:
FRANK H. SCHWAIGER
By Gravely, Lieder, Woodruff & Wills
ATTORNEYS.

United States Patent Office 2,823,125
Patented Feb. 11, 1958

2,823,125

APPARATUS FOR AND PROCESS OF FERMENTING BEER

Frank H. Schwaiger, St. Louis County, Mo., assignor to Anheuser-Busch, Incorporated, St. Louis, Mo., a corporation of Missouri Application March 9, 1956, Serial No. 570,483

10 Claims. (Cl. 99—31)

This invention relates to an improved apparatus for and process of fermenting beer. The present invention represents an improvement in the apparatus shown in and an improvement in the method claimed in United States Gull Patent No. 2,136,685, dated November 15, 1938, and assigned to Anheuser-Busch, Inc.

In the manufacture of beer, it is well known that during the main fermentation period a heavy foam is formed which contains extremely bitter sediment. In some instances, this foam is manually skimmed off to prevent it from collapsing and mixing with the beer itself, thereby giving the beer a harsh bitter taste. With closed fermenters where it is impossible to manually skim off the foam, suitable chambers are provided for capturing the foam, filtering it, and redirecting the condensate back into the fermenter wherein the foam originally formed. A fermenter construction commonly used for accomplishing this result is shown in the Gull Patent No. 2,136,685. In practice, such a fermenter is usually made from concrete or some other relatively heavy material with a relatively large upwardly extending foam chamber thereon for capturing and filtering foam and allowing the filtered condensate to flow by gravity back into the fermenter. The filtered condensate is relatively free of or is greatly reduced in harsh bitter sediment content. Because of their relative position in a gravity flow process for making beer, the fermenter tanks are usually located in an elevated story in the brewery. If they are provided with an upwardly extending foam chamber, they usually are about two stories in height. Such fermenters are permanently built in the brewery and have a tendency to crack which in turn causes cracking in the brittle fermenter tank lining material. They are expensive and present many installation and upkeep problems.

One of the principal objects of the present invention is to provide an improved fermenter which can be fabricated from stainless steel and which requires no overhead chamber for capturing foam which must necessarily rise upwardly into said chamber. Another object is to provide an improved fermenter which requires no special housing, which is easily housed on a single floor of a building, which can be easily cleaned, which requires less space per unit capacity, and which separates the foam from the beer more completely and more efficiently. Another object is to provide a fermenter construction which moves the foam automatically toward the foam chamber. Another object is to provide a fermenter which without moving parts automatically prevents beer from spilling over a baffle into the foam chamber even though the beer increases in volume during fermentation. Another object is to provide a fermenter which can be fabricated in a metal fabricating shop, shipped to the brewery, and placed upon a suitable base therein.

Another principal object of the present invention is to provide an improved process wherein the foam condensate is directed back into the manufacturing process at a different point from where the foam was taken. Another object is to provide a process wherein the foam condensate can be filtered or treated before it is redirected into the process.

These and other objects and advantages will become apparent hereinafter.

This invention is embodied in an improved fermenter which more completely and automatically separates the foam which contains bitter sediment from the beer. The foam condensate can then be filtered or otherwise treated and directed back into the manufacturing process at a different stage thereof.

The invention further consists in the process hereinafter described and claimed, and in the apparatus for practicing said process. In the accompanying drawings which form part of this specification and wherein like numerals and symbols refer to like parts wherever they occur:

Fig. 1 is a diagrammatic top plan view of a fermenting tank embodying the present invention, Fig. 2 is a diagrammatic side elevational view thereof showing the side wall which is positioned higher, Fig. 3 is a vertical cross sectional view of the actual construction taken along the line 3—3 of Fig. 1, Fig. 4 is a front elevational view of the actual fermenting tank, Fig. 5 is a side elevational view of said fermenting tank showing the side wall which is positioned lower, and Fig. 6 is a beer production flow diagram showing the new process in a typical process for making beer.

Referring now to the drawings in detail, it will be seen that the embodiment of the invention which has been illustrated comprises a beer fermenter or fermenting tank 1 having a relatively large beer chamber 2 of truncated rectangular shape, a relatively small foam chamber 3 of triangular shape, and a short intermediate bottomless inactive chamber or zone 4 therebetween of trapezoidal shape. In practice, the tank 1 has a capacity of about 400 barrels and is approximately 21 feet long, 12 feet wide, and 8 feet high. However, the capacity and overall dimensions can be varied as desired without departing from the present invention. While stainless steel is preferred, obviously other base metals or materials properly treated or lined could be used as a material.

The fermenting tank 1 comprises a pair of opposed relatively long side walls 5 and 6 and a pair of relatively short side walls 7 and 8 joined along their edges. All corners are rounded for sanitary and cleaning purposes. The stainless steel walls are provided with vertical and horizontal ribs 9 and 10 for strengthening purposes. The side wall 5 is positioned higher than the side wall 6, and the front wall 7 is of greater height than the rear wall 8. The tank 1 is provided with a bottom 11 which is inclined slightly downwardly toward an outlet 12. The high point 13 of the bottom 11 is diagonally opposite to the low point and outlet 12. The tank is provided with a sloping roof or cover 14 whose low point 15 is diagonally opposite to its high point 16 at the foam chamber 3. The tank 1 is provided with a baffle 17 extending angularly between the two adjacent side walls 5 and 7 thereby forming a foam chamber 3 in one corner thereof. All corners in the foam chamber 3 are rounded for sanitary and cleaning purposes. The baffle 17 has a bottom edge 18 which seats on the tank bottom 11 and is secured thereto, such as by welding, so that no liquid fermenting beer can pass or seep into the foam chamber 3. The baffle 17 extends substantially vertically upwardly and is provided with a top edge 19 which is positioned below the roof or cover 14 but which is substantially in the same horizontal plane as the low point 15 of the roof 14. Preferably, the top edge 19 of the baffle 17 is about four inches below the roof 14 and the space therebetween is completely occupied by foam. The baffle 17 together with the adjacent end portions of the side walls 5 and 7 form the foam chamber 3 of triangular cross section. The foam chamber 3 is provided with an outlet 20 in the lower portion thereof, preferably in the tank bottom 11. The foam chamber 3 is also provided with a manhole 21 for cleaning purposes.

The baffle 17 divides the tank 1 into the relatively small foam chamber 3 at one corner thereof and a relatively large beer chamber 2. The beer chamber 2 is provided with two beer connections 22 used either for filling or as outlets at some convenient location, preferably in the lower portion of said front side wall 7 about eight inches from the bottom edge thereof. The connections 22 are directly above the beer outlet 12 at the low point of said sloping bottom 11. The short intermediate chamber 4 is formed between the baffle 17 and a relatively short second baffle 23 which is mounted parallel to said first baffle 17 about two feet therefrom and is secured to the same side walls 5 and 7 as said first baffle 17. The bottom edge 24 of said short baffle 23 is positioned upwardly from said tank bottom 11 and the top edge 25 of said second baffle 23 is positioned preferably about 2 inches below the top edge 19 of the first baffle 17. An inclined screen or ramp 26 is mounted between the top edges 19 and 25 of said baffles 17 and 23 respectively. The screen 26 is made from stainless steel and is preferably made in three parts for ease in removal and cleaning. The screen 26 has a pitch or slope of about 2 inches in two feet. Preferably, the second baffle 23 extends downwardly into beer chamber 2 about two feet to provide an inactive zone 4 between the baffles 17 and 23.

In operation, beer is directed into the tank 1 through the beer connections 22 to fill the beer chamber 2 up to the top edge 25 of the second or lower baffle 23 so that the beer level is approximately one inch below the low point 15 of the roof 14. The flow of incoming beer is then cut off. During the beer fermenting period, foam forms on the top of the beer and the volume of the beer increases slightly due to fermentation thereby reducing the space 27 between the beer and the roof 14. The height of the baffle 17 is such that the beer at its maximum volume and level does not flow over the top edge 19 thereof. The low point 15 of the roof 14 is positioned so that it is just contacted by the beer in its most expanded stage. As foam forms on the beer and as the volume of beer increases during fermentation, the space 27 between the beer and the roof 14 decreases and the slope of the roof 14 presses or forces the foam toward the inclined screen 26 and up the inclined surface thereof to the top edge 19 of the baffle 17. Any beer carried with the foam and a small portion of the foam itself collapses and drains through the screen 26 after which it falls into the bottomless chamber or inactive zone 4 of the main body of the beer. The major portion of the foam eventually reaches the upper edge 19 of the baffle 17 and spills slowly into the foam chamber 3 where it condenses into a liquid and is removed through the outlet 20. The second baffle 23 not only supports the lower edge of the screen 26, but also extends downwardly about two feet into the beer thereby reducing the amount of foam on the surface of the beer beneath the screen. It is thought that the second baffle 23 sets up a dead space or an inactive zone 4 between it and the first baffle 17 since said second baffle 23 prevents normal convection currents set up by the fermenting beer from reaching the zone 4. Therefore, little or no foam forms on the beer in the inactive zone 4 beneath the inclined screen 26. The second baffle 23 also acts to prevent foam from being forced under screen 26 and aids in a skimming action to direct the foam over screen 26.

The foam chamber 3 also serves as a collecting point for the initial waste gas and later the pure gas that is evolved during the fermentation process. These gases, either pure or impure, are removed from the fermenter through the gas outlet 28 and can be used for various purposes in the brewery. The fermenter 1 is provided with a manhole 29 in the front wall 7 so that the inside of the tank 1, especially the sloping roof 14, can be cleaned. If desired, the top portion of the baffle 17 can be provided with a vertically movable strip or weir, not shown, to adjust the height or top edge 19 of the baffle 17 until the tank functions properly under a certain set of conditions which will be repeated for production purposes so that no future adjustments will be necessary.

With a fermenter tank of the capacity and dimensions hereinbefore described, it is important that the top edge 19 of the first baffle 17 is approximately two inches above the level of the top edge 25 of the second baffle 23 and is approximately one inch above the low point 15 of the roof 14. It is also important that the distance from the roof 14 to the top edge 19 of the first baffle 17 is approximately four inches, so that the pitch or slope of the roof 14 is about five inches in about eighteen to twenty feet. These two and five inch distances are critical approximately to plus or minus one-half inch, but might have to be varied if the capacity and overall dimensions of the tank are varied considerably. The slope and two inch vertical rise of the inclined screen 26 are also critical within limits. The distance between the top level of the beer and the sloping roof 14 must not be so great that the foam collapses of its own weight and falls back into the liquid fermenting beer in the beer chamber 2, and it must not be so great as to prevent foam from contacting the sloping roof 14 since any such contacting foam which bursts collapses on the roof 14 and deposits the harsh bitter sediment thereon. Nor must the distance between the top level of the beer and the sloping roof 14 be too small since beer expands during fermentation and any beer which contacts the sloping roof 14 reduces the area of the roof 14 on which the foam can collapse. This reduces the capacity of the roof to aid in the removal of the harsh bitter sediment from the beer. Thus, the sloping roof 14 forms a large area on which a portion of harsh bitter sediment can be deposited. The remaining portion moves up the inclined screen 26 as part of the foam and then falls into the foam chamber 3. It is apparent therefore that the beer in its expanded condition should be approximately at the level of the low point 15 of the roof 14 so that the full area of the roof is available at all times to receive a deposit of harsh bitter sediment. If the beer level then increases further, it not only reduces this area but the bitter sediment already deposited thereon is then contacted by the beer and can fall back into the beer.

The deposit on the sloping roof 14 and in the foam chamber 3 is tan or brown in color and is composed of yeast cells and protein and hop resins which might be retained from the brewing stage, all of which should be removed in the fermenting stage to reduce or eliminate harsh bitterness. This deposit is known as Brand-Hefe in the industry.

The new process for fermenting beer which utilizes the fermenter tank 1 hereinbefore described is best shown in Fig. 6. In this new process, the steps in the manufacturing of beer are unchanged until the beer reaches the main fermenter. In the past, the foam formed in the fermenter 1 was either discarded or was filtered and the condensate was redirected into the fermenter tank where it originally formed. The new process collects the foam in the foam chamber, condenses it, treats it in a separate treating station 30, and then directs the condensed treated foam into a subsequent or future step of the process. Thus, the condensate is treated by filtering or other treatment processes and is directed back into the manufacturing process, but at one of several different future stages thereof, such as into the rest tank as shown in Fig. 6. While the amount of foam varies, the condensate usually amounts to slightly over one percent of the total amount of beer in the beer chamber.

This invention is intended to cover changes and modifications of the example of the invention herein chosen for purposes of the disclosure, which do not constitute departures from the spirit and scope of the invention.

What I claim is:

1. A fermenting tank for making beer comprising a plurality of side walls, a bottom and an inclined roof, a baffle angularly mounted within said tank between two adjacent side walls, said baffle dividing said tank into two chambers of unequal size, the large chamber being a beer chamber and the small chamber being a foam chamber, said baffle having a top edge which is spaced below said roof but above the level of beer within said tank after fermentation, a second baffle mounted in said large chamber between said two adjacent side walls, said second baffle having a top edge positioned substantially at the normal level of the incoming beer and a bottom edge which terminates below the level of the beer and above said bottom, inclined filtering means mounted between the top edges of said first and second baffles, a beer inlet and outlet in said large beer chamber, an outlet in the lower portion of said small foam chamber, and a gas outlet for removing gases which form during fermentation.

2. A fermenting tank for making beer comprising a plurality of side walls, a bottom and a roof, a baffle angularly mounted within said tank between two adjacent side walls, said baffle dividing said tank into two chambers of unequal size, the large chamber being a beer chamber and the small chamber being a foam chamber, said baffle having a top edge which is spaced below said roof, a second baffle mounted in said large chamber between said two adjacent side walls, said second baffle having top and bottom edges which terminate below and above the top and bottom edges respectively of said first mentioned baffle, an inclined screen mounted between the top edges of said first and second baffles, a beer inlet and outlet in said large beer chamber, an outlet in the lower portion of said small foam chamber, and a gas outlet for removing gases which form during fermentation.

3. A fermenting tank for making beer comprising a plurality of side walls, a sloping bottom and an inclined roof, a baffle angularly mounted within said tank between two adjacent side walls, said baffle dividing said tank into two chambers of unequal size, the large chamber being a beer chamber and the small triangular chamber being a foam chamber, said baffle extending vertically upwardly from the bottom of said tank and having a top edge which is spaced below said roof but above the normal level of beer within said tank, a second baffle mounted in said large chamber between said two adjacent side walls and parallel to said first baffle, said second baffle having top and bottom edges which terminate below and above the top and bottom edges respectively of said first mentioned baffle, said second baffle having its top edge at the normal beer level, said first baffle having its top edge above the expanded beer level due to fermentation, an inclined screen mounted between the top edges of said first and second baffles, said inclined roof having a low point remotely positioned from said baffles and substantially on said expanded beer level, said roof being inclined upwardly toward said baffles, a beer inlet and outlet in said large beer chamber, a beer outlet in the lower portion of said small foam chamber, and a gas outlet for removing gases which form during fermentation.

4. A fermenting tank for making beer comprising a plurality of side walls, a sloping bottom and an inclined roof, a baffle angularly mounted within said tank in a corner thereof between two adjacent side walls, said baffle dividing said tank into two chambers of unequal size, the large chamber being a beer chamber and the small triangular chamber being a foam chamber, said baffle extending vertically upwardly from the bottom of said tank and having a top edge which is spaced below said roof but above the normal level of beer within said tank, a second baffle mounted in said large chamber between said two adjacent side walls and parallel to said first baffle, said second baffle having top and bottom edges which terminate below and above the top and bottom edges respectively of said first-mentioned baffle thereby forming a bottomless chamber therebetween, an inclined screen mounted between the top edges of said first and second baffles and covering the entire space between said baffles, a beer inlet and a beer outlet in said large beer chamber, an outlet in the lower portion of said small foam chamber, a gas outlet in the upper portion of said tank above said foam chamber for removing gases which form during fermentation, and means for varying the height of said first baffle.

5. In a method for making beer, the steps of fermenting beer wort in a beer chamber of a closed fermenting tank, causing the foam to press upwardly along an inclined filtering means within said fermenting tank through which a portion of stid foam passes, directing said portion back into the fermenting tank, causing the remaining portion of said foam to spill over a baffle into a foam chamber, condensing and treating said foam, and redirecting said condensed and treated foam back into the beer process at a point between said fermenting tank and the final step of making said beer.

6. In a method for making beer, the steps of fermenting beer wort in a closed fermenting tank having a baffle therein dividing said tank into a beer chamber and a foam chamber, causing the foam on the beer in said beer chamber to press upwardly along an inclined screen positioned downwardly into said beer chamber from the upper portion of said baffle, directing that portion of the foam which condenses on said inclined screen back into the beer chamber, causing the remaining foam to press over said baffle into said foam chamber, condensing and treating said foam and directing said condensed and treated foam back into said beer making process.

7. In a method for making beer, the steps of fermenting beer wort in a closed fermenting tank having a baffle therein dividing said tank into a beer chamber and a foam chamber, causing the foam on the beer to be automatically directed upwardly along an inclined filtering means toward said baffle at one end portion of said tank, directing that portion of the foam which passes through said filtering means back into the beer chamber in a foamless zone beneath said filtering means, causing the remaining foam to press upwardly over said filtering means and said baffle into said foam chamber, condensing and treating said foam, and directing said condensed and treated foam into a rest tank.

8. A fermenting tank for making beer comprising a bottom and an inclined roof with a circumscribing wall therebetween, a baffle mounted within said tank and dividing said tank into two chambers, one chamber being a beer chamber and the other chamber being a foam chamber, said baffle having a top edge which is spaced below said inclined roof, ramp means extending angularly downwardly from the top portion of said baffle into said beer chamber, a beer inlet and outlet in said beer chamber, and an outlet in the foam chamber.

9. A fermenting tank for making beer comprising a plurality of side walls, a bottom and an inclined roof, a baffle mounted within said tank between two side walls, said baffle dividing said tank into two chambers of unequal size, the large chamber being a beer chamber and the small chamber being a foam chamber, said baffle having a top edge which is spaced below said roof but above the level of beer within said tank after fermentation, ramp means extending angularly downwardly from the top portion of said baffle into said large beer chamber, a beer inlet and outlet in said large beer chamber, an outlet in said small foam chamber, and a gas outlet for removing gases which form during fermentation.

10. A fermenting tank for making beer comprising a plurality of side walls, a sloping bottom and an inclined roof, a baffle mounted within said tank between two side walls, said baffle dividing said tank into two chambers of unequal size, the large chamber being a beer chamber and the small chamber being a foam chamber, said baffle extending upwardly from the bottom of said tank and having a top edge which is spaced below said roof but above the normal level of beer within said tank, said baffle having its top edge above the expanded beer level due to fermentation, ramp means extending angularly downwardly from the top portion of said baffle into said large beer chamber, said inclined roof having a low point remotely positioned from said baffle and substantially on said expanded beer level, said roof being inclined upwardly toward said baffle, a beer inlet and outlet in said large beer chamber, a beer outlet in the lower portion of said small foam chamber, and a gas outlet for removing gases which form during fermentation.

References Cited in the file of this patent

UNITED STATES PATENTS

| | | |
|---|---|---|
| 2,310,270 | Zerweck | Feb. 9, 1943 |
| 2,635,070 | Gordon et al. | Apr. 14, 1953 |

FOREIGN PATENTS

| | | |
|---|---|---|
| 469,058 | Great Britain | July 19, 1937 |